US011565822B2

(12) United States Patent
Auge et al.

(10) Patent No.: US 11,565,822 B2
(45) Date of Patent: Jan. 31, 2023

(54) PROPULSION ASSEMBLY FOR AN AIRCRAFT, COMPRISING A LOAD SUPPORT

(71) Applicant: Airbus Operations SAS, Toulouse (FR)

(72) Inventors: Philippe Auge, Brax (FR); Benoit Orteu, Toulouse (FR); Julien Bernat, Toulouse (FR); Jean Geliot, Toulouse (FR); Delphine Jalbert, Toulouse (FR); Frédéric Ridray, L'Isle Jourdain (FR); Laurent Lafont, Pechbusque (FR); Pascal Gardes, Levignac (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 397 days.

(21) Appl. No.: 16/708,760

(22) Filed: Dec. 10, 2019

(65) Prior Publication Data

US 2020/0189759 A1 Jun. 18, 2020

(30) Foreign Application Priority Data

Dec. 12, 2018 (FR) ...................................... 1872734

(51) Int. Cl.
*B64D 27/26* (2006.01)
*B64D 27/18* (2006.01)
(Continued)

(52) U.S. Cl.
CPC ............ *B64D 27/26* (2013.01); *B64D 27/18* (2013.01); *B64D 29/06* (2013.01);
(Continued)

(58) Field of Classification Search
CPC ........ B64D 27/26; B64D 27/18; B64D 29/06; F02C 7/20
See application file for complete search history.

(56) References Cited

U.S. PATENT DOCUMENTS 8,162,254 B2 * 4/2012 Roche .................... B64D 29/08
244/54
8,939,398 B2 * 1/2015 Letay .................... B64D 29/06
244/54
(Continued)

FOREIGN PATENT DOCUMENTS

EP 0784564 B1 12/1998
EP 1571081 A1 9/2005
(Continued)

OTHER PUBLICATIONS

French Search Report; priority document.

*Primary Examiner* — Michael H Wang
(74) *Attorney, Agent, or Firm* — Greer, Burns & Crain, Ltd.

(57) ABSTRACT

A propulsion assembly having a pylon, a turbomachine comprising an engine and a fan that is enclosed by a fan casing, a nacelle surrounding the engine and the fan casing and having a load support disposed in the top part of the nacelle, a front engine attachment between the pylon and a front part of the engine, a rear engine attachment between the pylon and a rear part of the engine, a front fan attachment between the fan casing and the load support, and a rear pylon attachment between the pylon and the load support. Such a propulsion assembly allows a reduction in bulk since the load of the turbojet engine is distributed between the load support and the pylon, and the pylon is attached to the engine.

3 Claims, 6 Drawing Sheets

(51) Int. Cl.
*B64D 29/06* (2006.01)
*F02C 7/20* (2006.01)
*F02K 3/06* (2006.01)

(52) U.S. Cl.
CPC .. *B64D 2027/266* (2013.01); *B64D 2027/268* (2013.01); *F02C 7/20* (2013.01); *F02K 3/06* (2013.01)

(56) References Cited

U.S. PATENT DOCUMENTS

| | | |
|---|---|---|
| 2005/0194493 A1 | 9/2005 | Marche |
| 2008/0156930 A1* | 7/2008 | Audart-Noel ....... F16C 11/0614 244/54 |
| 2009/0266932 A1* | 10/2009 | Roche ................... B64D 27/18 244/54 |
| 2011/0127369 A1* | 6/2011 | Dussol ................. B64D 27/26 244/54 |
| 2012/0056033 A1* | 3/2012 | Teulou .................. B64D 27/26 244/54 |
| 2012/0234970 A1* | 9/2012 | Marche ................. B64D 27/26 244/54 |
| 2013/0161446 A1 | 6/2013 | Letay et al. |
| 2015/0197341 A1* | 7/2015 | Ewens ..................... B64F 5/40 244/54 |
| 2016/0122029 A1* | 5/2016 | Serra .................... B64D 27/26 244/54 |
| 2016/0238032 A1* | 8/2016 | Hill ....................... F01D 25/243 |
| 2017/0096229 A1* | 4/2017 | Pautis ................... B64D 27/18 |
| 2019/0092484 A1* | 3/2019 | Whiteford ............. B64D 27/26 |
| 2019/0300144 A1* | 10/2019 | Campbell ............. B64D 27/26 |

FOREIGN PATENT DOCUMENTS

| | | | |
|---|---|---|---|
| EP | 2554478 A1 | 2/2013 | |
| FR | 3049582 A1 * | 10/2017 | ............. B64D 27/26 |
| WO | 2018031548 A1 | 2/2018 | |

* cited by examiner

PROPULSION ASSEMBLY FOR AN AIRCRAFT, COMPRISING A LOAD SUPPORT

CROSS-REFERENCES TO RELATED APPLICATIONS

This application claims the benefit of the French patent application No. 1872734 filed on Dec. 12, 2018, the entire disclosures of which are incorporated herein by way of reference.

FIELD OF THE INVENTION

The present invention relates to a propulsion assembly for an aircraft, the assembly comprising a pylon, a load support, a turbomachine having a fan casing, a front fan attachment for attaching the fan casing to the load support, and a rear pylon attachment for attaching the pylon to the load support. The invention also relates to an aircraft having at least one such propulsion assembly.

BACKGROUND OF THE INVENTION

An aircraft conventionally has a wing below which a pylon is fastened, to which a turbomachine is fastened. The turbomachine has an engine and a fan casing that are fastened to the pylon via a front engine attachment and a rear engine attachment, and the pylon is itself fastened to a structure of the wing of the aircraft.

Although such an installation is entirely satisfactory, it is relatively bulky. In particular, the front engine attachment is positioned on top of the fan casing, thereby forcing the pylon to be positioned above the fan casing.

SUMMARY OF THE INVENTION

It is an object of the present invention to propose an alternative propulsion assembly which allows space to be saved.

To this end, the invention proposes a propulsion assembly for an aircraft, the propulsion assembly having:
  a pylon intended to be fastened below a wing of the aircraft,
  a turbomachine comprising an engine and a fan that is enclosed by a fan casing and is disposed upstream of the engine, the turbomachine having a longitudinal direction X and a median plane XZ,
  a nacelle surrounding the engine and the fan casing and having a load support disposed in the top part of the nacelle and lateral cowls mounted in a hinged manner on either side of the load support,
  a front engine attachment fastened between the pylon and a front part of the engine,
  a rear engine attachment fastened between the pylon and a rear part of the engine,
  a front fan attachment fastened between the fan casing and the load support, and
  a rear pylon attachment fastened between the pylon and the load support.

Such a propulsion assembly allows a reduction in bulk since the load of the turbojet engine is distributed between the load support and the pylon, and the pylon is attached to the engine.

According to a first particular embodiment, the front fan attachment comprises a positioning assembly disposed on the median plane XZ, and two rotational systems disposed on either side of the median plane XZ and of the positioning assembly, the positioning assembly comprises a base that is secured to the top part of the fan casing and a peg that is secured to the load support, extends vertically and is inserted into a bore in the base, and each rotational system fastens the fan casing to the load support and allows rotation about an axis generally parallel to the longitudinal direction X.

Advantageously, each rotational system comprises a clevis which is fastened to the fan casing and the axis of rotation of which extends parallel to the longitudinal direction X, a plate that is inserted into and hinged in the clevis and fastened to the load support, and a shaft that is secured to the plate and is inserted into the orifices of the clevis, the clevis comprises orifices of elongate shape, the major axis of which is generally parallel to a transverse direction Y and into which the shaft is inserted, and the plate is inserted into the clevis with a clearance between the clevis and the plate parallel to the longitudinal direction X.

Advantageously, the rear pylon attachment comprises a first clevis fastened below the load support, a second clevis fastened above the pylon, and a double plate disposed in the first clevis and the second clevis, the double plate is mounted in a hinged manner on the first clevis about a first axis of rotation and on the second clevis about two second axes of rotation, the first axis of rotation is generally parallel to the longitudinal direction X and included in the median plane XZ, and the two second axes of rotation are generally parallel to the longitudinal direction X and disposed on either side of the median plane XZ.

According to a second particular embodiment, the front fan attachment comprises a positioning assembly disposed on the median plane XZ, and two rotational systems disposed on either side of the median plane XZ and of the positioning assembly, the positioning assembly comprises a base that is secured to the top part of the fan casing and a peg that is secured to the load support, extends vertically and is inserted into a bore in the base, and each rotational system fastens the fan casing to the load support and allows rotation about an axis perpendicular to the median plane XZ.

Advantageously, the rear pylon attachment comprises two first devises, each of which is fastened below the load support, a second clevis fastened above the pylon, and, for each first clevis, a link rod, each first clevis has a first axis of rotation generally parallel to the longitudinal direction X and the two first axes of rotation are disposed on either side of the median plane XZ, the second clevis has three second axes of rotation generally parallel to the longitudinal direction X, one of which is central and included in the median plane XZ and the two others of which are lateral and disposed on either side of the median plane XZ, one of the link rods is mounted in a hinged manner on one of the first clevises about the corresponding first axis of rotation and on the second clevis about the central second axis of rotation and a lateral second axis of rotation, and the other link rod is mounted in a hinged manner on the other of the first clevises about the corresponding first axis of rotation and on the second clevis about the other lateral second axis of rotation.

According to a third particular embodiment, the front fan attachment comprises a first clevis fastened in the top part of the fan casing and has two first axes of rotation generally parallel to the longitudinal direction X and disposed on either side of the median plane XZ, for each first axis of rotation, a second clevis fastened to the load support and disposed on the outside with respect to the first axis of rotation, where each second clevis has a second axis of rotation generally parallel to the longitudinal direction X, and for each first axis of rotation, a link rod mounted in a hinged manner on the first clevis about the first axis of rotation and on the second clevis about the corresponding second axis of rotation.

According to another particular embodiment, the front fan attachment comprises two first clevises that are fastened in the top part of the fan casing on either side of the median plane XZ and each have a first axis of rotation generally parallel to the longitudinal direction X, for each first clevis, a second clevis fastened to the load support and disposed between the first clevis and the median plane XZ, where each second clevis has a second axis of rotation generally parallel to the longitudinal direction X, and for each first clevis, a link rod mounted in a hinged manner on the first clevis about the corresponding first axis of rotation and on the second clevis about the corresponding second axis of rotation.

Advantageously, the front fan attachment has at least one finger that is fastened to the load support and extends radially with respect to the longitudinal direction X, and a groove that is coaxial with the longitudinal direction X and realized at the perimeter of the fan casing, and the free end of each finger sits in the groove.

Advantageously, the rear pylon attachment comprises, on either side of the median plane XZ, a first clevis fastened below the load support, a second clevis fastened above the pylon, and a link rod, each clevis has an axis of rotation generally perpendicular to the median plane XZ, and each link rod is mounted in a hinged manner on one of the first clevises about its axis of rotation and on one of the second clevises about its axis of rotation.

The invention also proposes an aircraft having at least one propulsion assembly according to one of the above variants.

BRIEF DESCRIPTION OF THE DRAWINGS

The abovementioned features of the invention, together with others, will become more clearly apparent from reading the following description of an exemplary embodiment, the description being given with reference to the appended drawings, in which:

FIG. 4 is a front view of a front fan attachment of the load support shown in

FIG. 3,

FIG. 9 is a front view of a front fan attachment of the load support shown in

FIG. 8,

DETAILED DESCRIPTION OF THE PREFERRED EMBODIMENTS

Throughout the following description, by convention, the direction X corresponds to the longitudinal direction of the turbomachine, this direction being parallel to the longitudinal axis X of this turbomachine and oriented towards the front of the aircraft. Moreover, the direction Y corresponds to the direction oriented transversely to the turbomachine, and the direction Z corresponds to the vertical direction or height, these three directions being mutually orthogonal. The turbomachine has a median plane XZ.

Figure 1:
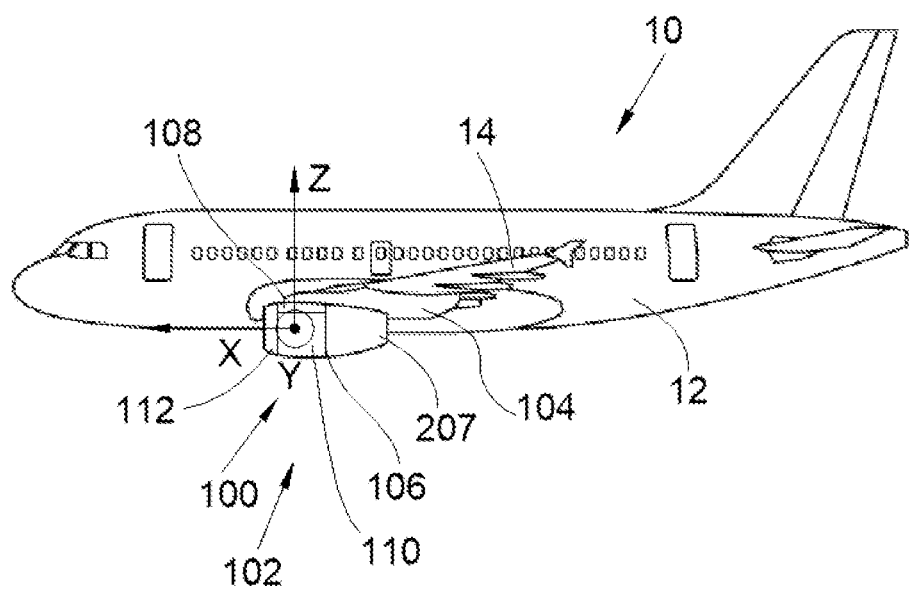
FIG. 1 is a side view of an aircraft having a propulsion assembly according to the invention.

FIG. 1 shows an aircraft 10, which has a fuselage 12 to which two wings 14 are attached, on either side of the fuselage 12. Fastened below each wing 14 is at least one propulsion assembly 100, which has a pylon 104 fastened below the wing 14 and a bypass turbomachine 102 that is fastened to the pylon 104 and has an engine 202 (FIG. 2) and a fan that is enclosed by a fan casing 204, is disposed upstream of the engine 202 and is driven by the engine 202.

The propulsion assembly 100 also has a nacelle 106 of cylindrical shape that surrounds the engine 202 and the fan casing 204.

Figure 2:
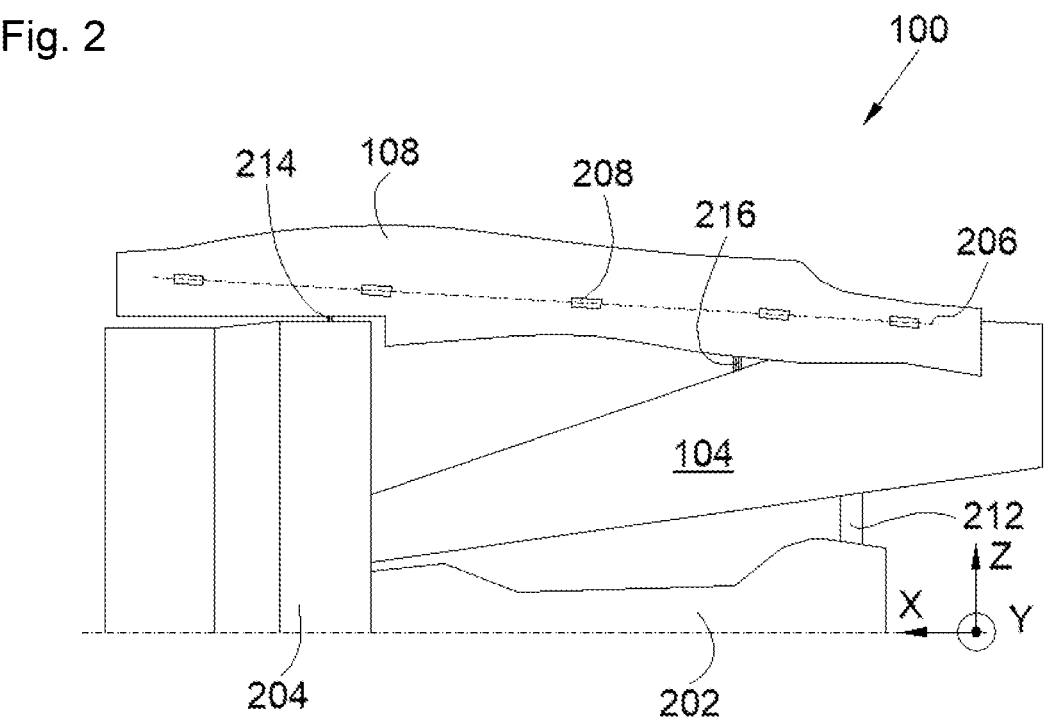
FIG. 2 is a side view of the propulsion assembly according to the invention.

FIG. 2 shows the propulsion assembly 100.

The nacelle 106 has a load support 108, which is disposed in the top part of the nacelle 106, and lateral cowls 110, which are mounted in a hinged manner on either side of the load support 108 about a hinge line 206. Each lateral cowl 110 is mounted in a hinged manner on a plurality of hinges 208 fastened to the load support 108.

The nacelle 106 also has in this case a nose cowl 112, which is fastened in front of the load support 108 and is extended as far as an air intake through which the air supplying the turbomachine 102 passes.

The pylon 104 is fastened to the structure of the wing 14 and bears the engine 202 to which it is fastened by a rear engine attachment 212 fastened between a rear part of the pylon 104 and a rear part of the engine 202 and a front engine attachment fastened between a front part of the pylon 104 and a front part of the engine 202, in particular at the hub of the engine 202. In the embodiment of the invention shown in FIG. 2, the front engine attachment is concealed by the fan casing 204.

The front engine attachment at the hub allows the pylon 104 to be lowered and thus space to be saved. The front engine attachment and the rear engine attachment 212 will not be described in more detail since they can take any of the forms known to a person skilled in the art.

The propulsion assembly 100 also has a front fan attachment 214 fastened between the fan casing 204 and the load support 108 and a rear pylon attachment 216 fastened between the pylon 104 and the load support 108.

The front fan attachment 214 is located in the top part of the fan casing 204.

The installation of the front fan attachment 214 and of the rear pylon attachment 216 makes it possible to compensate for the modification made to the pylon 104 compared with the prior art.

Such an arrangement also allows a better distribution of the tangential forces transmitted between the lateral cowls 110 through the load support 108.

The load support 108 forms a bridge between the pylon 104 and the fan casing 204.

The front fan attachment 214 and the rear pylon attachment 216 can have different shapes, particular embodiments of which are described below. These attachments make it possible to transmit the forces generated by the turbomachine 102 in operation, from the turbomachine 102 to the pylon 104 and to the load support 108 and to the structure of the wing 14.

Figure 3:
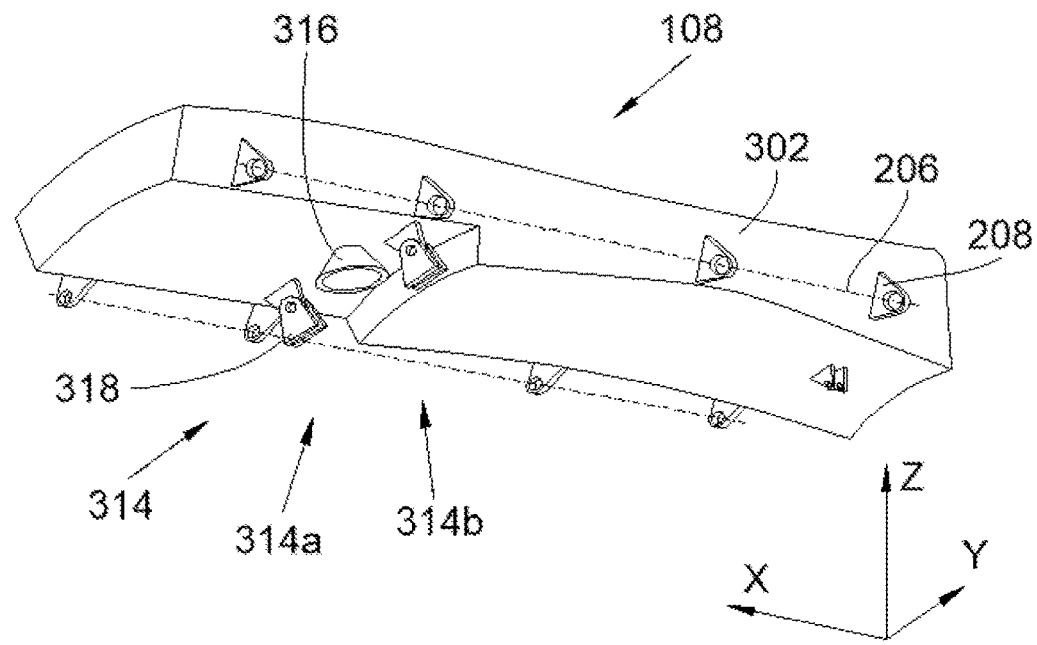
FIG. 3 is a perspective view of a load support according to a first embodiment of the invention.
Figure 4:
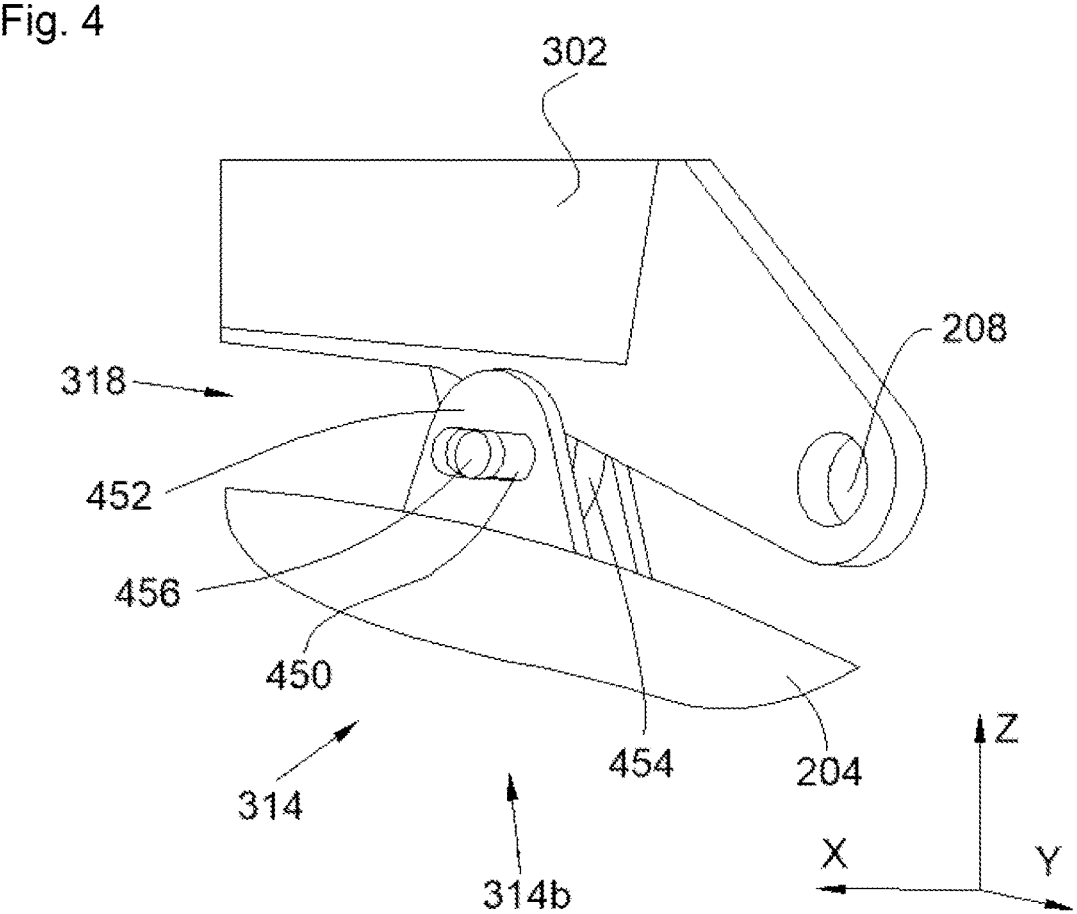
Figure 5:
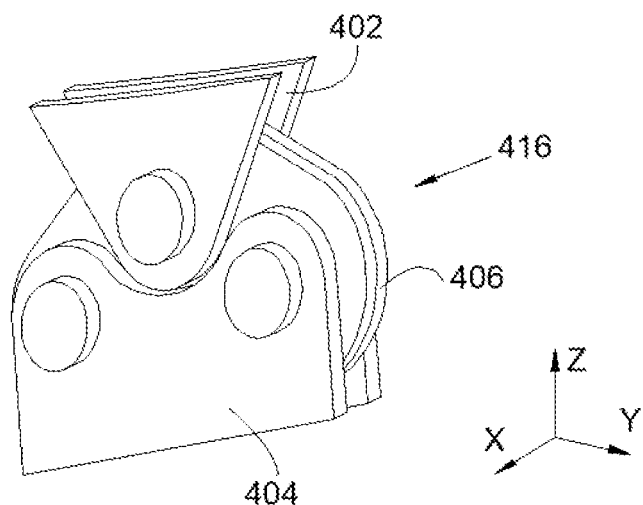
FIG. 5 is a perspective view of a rear pylon attachment of the load support shown in FIG. 3.

According to a first embodiment of the invention, and with reference to FIGS. 3 to 5, the load support 108 comprises a beam 302 that extends longitudinally generally parallel to the longitudinal direction X.

The front fan attachment 314 comprises a positioning assembly 314a, known as a "spigot," disposed on the median plane XZ of the turbomachine 102. The positioning assembly 314a comprises a base 316 secured to the top part of the fan casing 204 and a peg that is secured to the beam 302, and more generally to the load support 108, extends vertically and is inserted into a bore in the base 316 provided for this purpose. The positioning assembly 314a makes it possible to react forces on X and on Y.

The base 316 is frustoconical in this case.

The front fan attachment 314 (see FIG. 4) comprises a fastener 314b that comprises two rotational systems 318 disposed on either side of the median plane XZ and of the positioning assembly 314a. Each rotational system 318 fastens the fan casing 204 to the load support 108 and allows rotation about an axis generally parallel to the longitudinal direction X. The fastener 314b makes it possible to react forces on X and on Z.

In this case, each rotational system 318 comprises a clevis 452 which is fastened to the fan casing 204 and the axis of rotation of which extends parallel to the longitudinal direction X, a plate 454 that is inserted into and hinged in the clevis 452 and fastened to the load support 108, and a shaft 456 that is secured to the plate 454 and is inserted into the orifices of the clevis 452.

The clevis 452 comprises orifices 450 of elongate shape, the major axis of which is generally parallel to the transverse direction Y and into which the shaft 456 of the articulation of the plate 454 to the clevis 452 is inserted, thereby allowing transverse movement in the transverse direction Y of the clevis 452. Moreover, the plate 454 is inserted into the clevis 452 with a clearance between the clevis 452 and the plate 454 parallel to the longitudinal direction X, allowing the clevis 452 to move parallel to the longitudinal direction X with respect to the clevis 452.

The rear pylon attachment 416 (see FIG. 5) comprises a first clevis 402 fastened below the load support 108, and a second clevis 404 fastened to the pylon 104.

The first clevis 402 has a first axis of rotation that is generally parallel to the longitudinal direction X and is included in the median plane XZ.

The second clevis 404 has two second axes of rotation that are generally parallel to the longitudinal direction X and disposed on either side of the median plane XZ.

The rear pylon attachment 416 also comprises a double plate 406 disposed in the first clevis 402 and the second clevis 404. The double plate 406 is mounted in a hinged manner on the first clevis 402 about the first axis of rotation and on the second clevis 404 about each second axis of rotation. The double plate 406 is made up of two single plates side by side.

The rear pylon attachment 416 makes it possible to react forces on Y and on Z.

Figure 6:
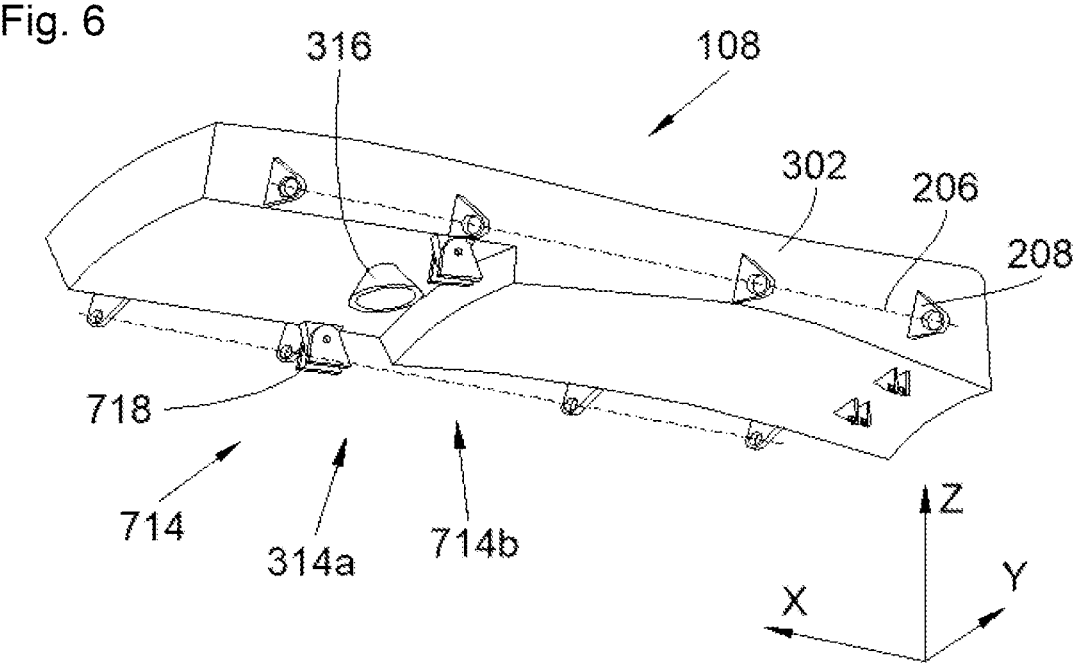
FIG. 6 is a perspective view of a load support according to a second embodiment of the invention.
Figure 7:
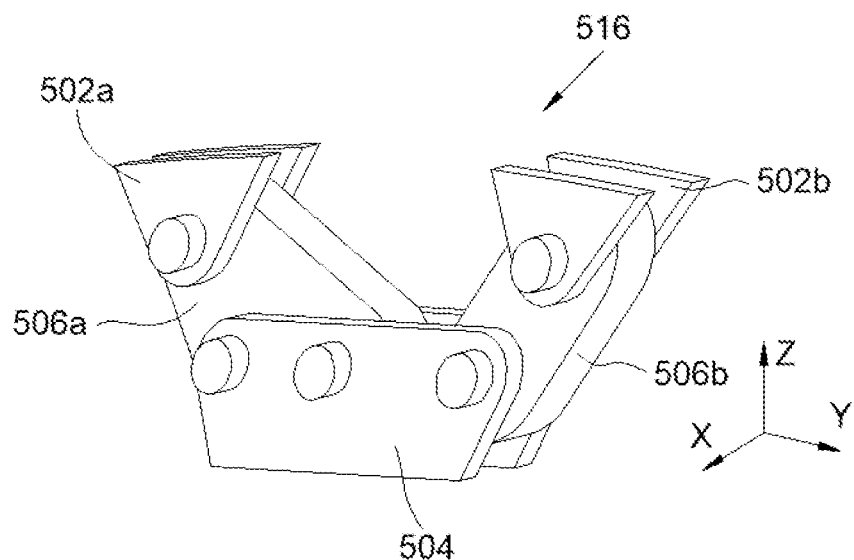
FIG. 7 is a perspective view of a rear pylon attachment of the load support shown in FIG. 6.
Figure 8:
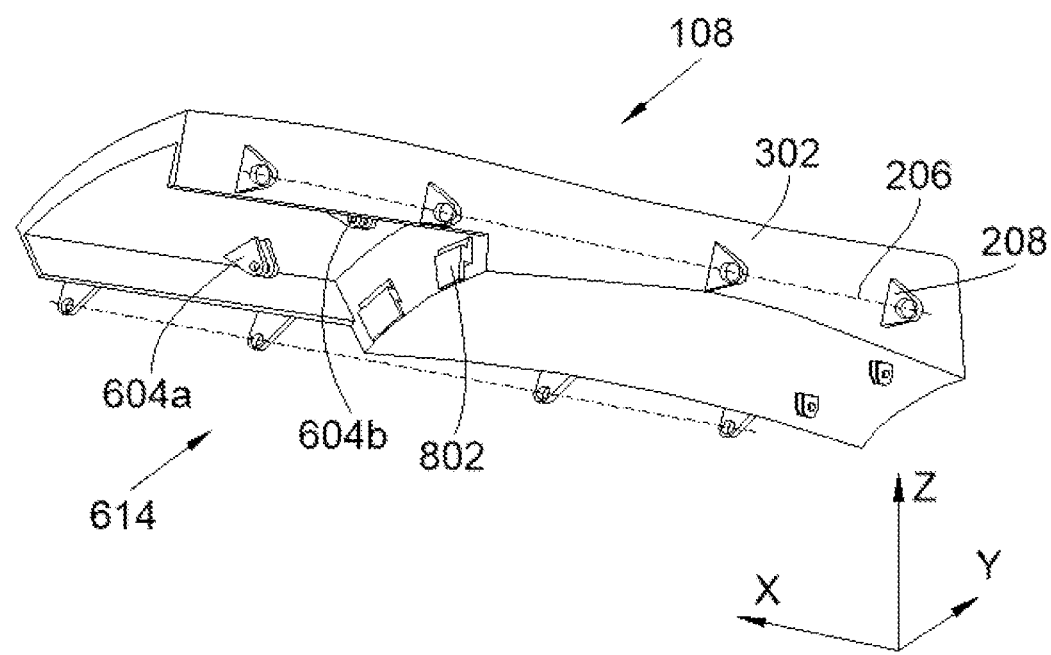
FIG. 8 is a perspective view of a load support according to a third embodiment of the invention.
Figure 9:
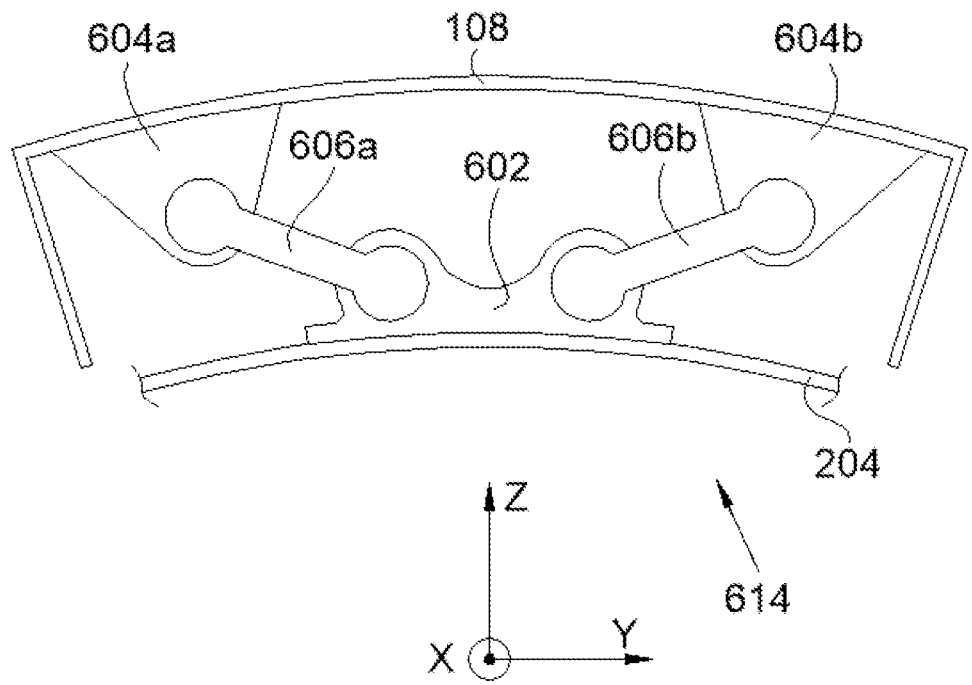
Figure 10:
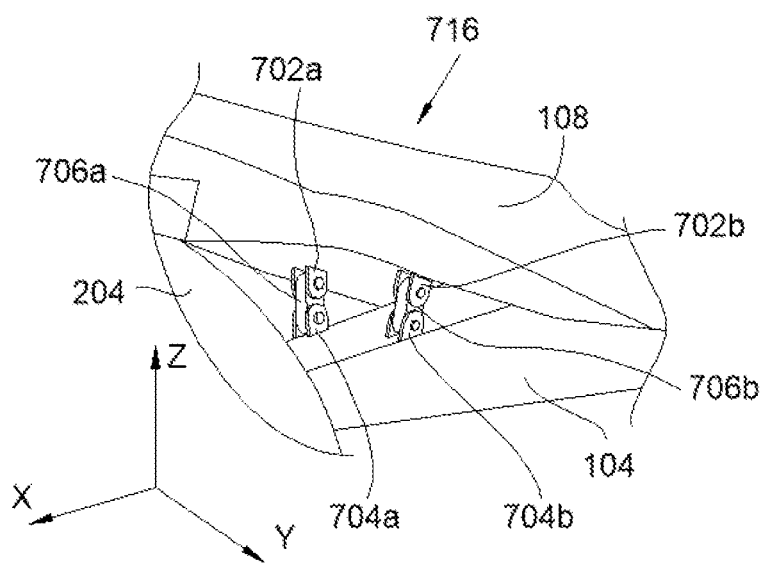
FIG. 10 is a perspective view of a rear pylon attachment of the load support shown in FIG. 8.

According to a second embodiment of the invention, and with reference to FIGS. 6 and 7, the load support 108 comprises a beam 302 that extends longitudinally generally parallel to the longitudinal direction X.

In a similar manner to the first embodiment, the front fan attachment 714 comprises a positioning assembly 314a that is arranged on the median plane XZ of the turbomachine 102, is intended to react forces on X and on Y and is similar to that of the first embodiment.

The front fan attachment 714 comprises a fastener 714b that comprises two rotational systems 718 disposed on either side of the median plane XZ and of the positioning assembly 314a. Each rotational system 718 fastens the fan casing 204 to the load support 108 and allows rotation about an axis generally parallel to the transverse direction Y, that is to say, perpendicular to the median plane XZ. The fastener 714b makes it possible to react forces on Y.

In this case, each rotational system 718 comprises a clevis which is fastened to the fan casing 204 and the axis of rotation of which extends parallel to the transverse direction Y, and a plate that is inserted into and articulated in the clevis and fastened to the load support 108.

The rear pylon attachment 516 (see FIG. 7) comprises two first clevises 502a-b, each of which is fastened below the load support 108, and a second clevis 504 fastened to the pylon 104.

For each first clevis 502a-b, the rear pylon attachment 516 comprises a link rod 506a-b.

Each first clevis 502a-b has a first axis of rotation generally parallel to the longitudinal direction X and the two first axes of rotation are disposed on either side of the median plane XZ.

The second clevis 504 has three second axes of rotation generally parallel to the longitudinal direction X, one of which is central and included in the median plane XZ and the two others of which are lateral and disposed on either side of the median plane XZ.

One of the link rods 506a is mounted in a hinged manner on one of the first clevises 502a about its first axis of rotation and on the second clevis 504 about the central second axis of rotation and a lateral second axis of rotation.

The other link rod 506b is mounted in a hinged manner on the other of the first clevises 502b about its first axis of rotation and on the second clevis 504 about the other lateral second axis of rotation.

The rear pylon attachment 516 makes it possible to react forces on Y and on Z.

According to a third embodiment of the invention, and with reference to FIGS. 8 to 11, the load support 108 comprises a beam 302 that extends longitudinally generally parallel to the longitudinal direction X.

The front fan attachment 614 (see FIG. 9) is arranged between the load support 108 and the top part of the fan casing 204. The front fan attachment 614 comprises a first clevis 602 fastened in the top part of the fan casing 204 and has two first axes of rotation that are generally parallel to the longitudinal direction X and are disposed on either side of the median plane XZ.

For each first axis of rotation, the front fan attachment 614 comprises a second clevis 604a-b fastened to the load support 108 and disposed on the opposite side to the median plane XZ with respect to the first axis of rotation, that is to say, on the outside with respect to the first axis of rotation. Each second clevis 604a-b has a second axis of rotation generally parallel to the longitudinal direction X.

For each first axis of rotation, the front fan attachment 614 has a link rod 606a-b mounted in a hinged manner on the first clevis 602 about the first axis of rotation and on the second clevis 604a-b about the corresponding second axis of rotation.

The front fan attachment 614 makes it possible to react forces on Y and on Z.

Figure 11:
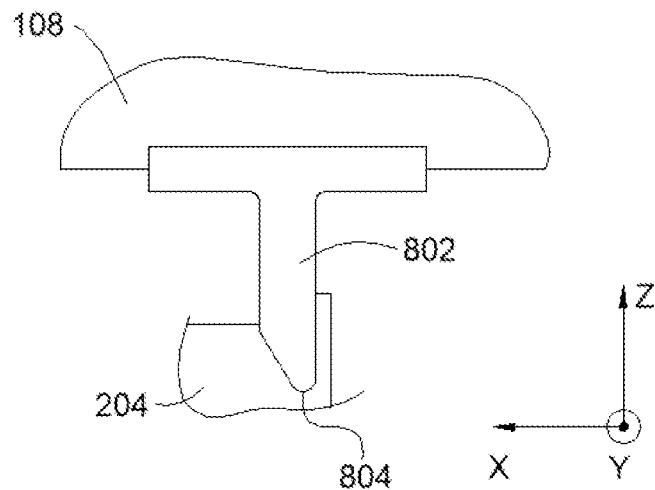
FIG. 11 is a side view of an embodiment detail of the third embodiment of the invention.

In order to react forces on X, the front fan attachment 614 has at least one finger 802, which is shown in detail in FIG. 11.

Each finger 802 is fastened to the load support 108 and extends radially with respect to the longitudinal direction X.

The front fan attachment 614 also has a groove 804 that is coaxial with the longitudinal direction X and realized at the perimeter of the fan casing 204, where the free end of each finger 802 sits in the groove 804.

The rear pylon attachment 716 (see FIG. 10) comprises, on either side of the median plane XZ, a first clevis 702a-b fastened below the load support 108, a second clevis 704a-b fastened above the pylon 104, and a link rod 706a-b.

Each clevis 702a-b, 704a-b has an axis of rotation generally perpendicular to the median plane XZ.

Each link rod 706a-b is mounted in a hinged manner on one of the first clevises 702a-b about its axis of rotation and on one of the second clevises 704a-b about its axis of rotation.

The rear pylon attachment 716 makes it possible to react forces on Y and on Z.

Figure 12:
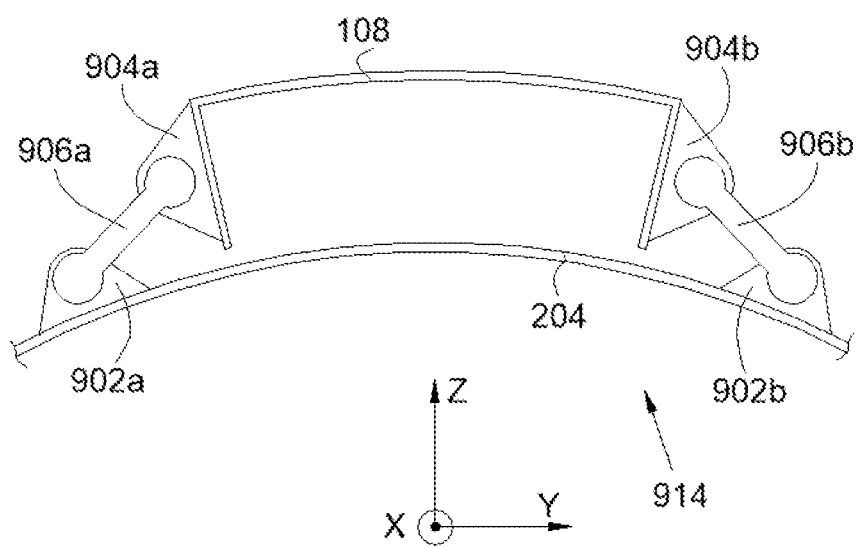
FIG. 12 is a front view of a load support according to a variant of the third embodiment of the invention.

In a variant of the third embodiment, and with reference to FIG. 12, the front fan attachment 914 is modified in that the latter comprises two first devises 902a-b that are fastened in the top part of the fan casing 204 on either side of the median plane XZ and each have a first axis of rotation generally parallel to the longitudinal direction X.

For each first clevis 902a-b, the front fan attachment 914 comprises a second clevis 904a-b that is fastened to the load support 108 and disposed on the same side as the median plane XZ with respect to the first clevis 902a-b, that is to say, between the first clevis 902a-b and the median plane XZ. Each second clevis 904a-b has a second axis of rotation generally parallel to the longitudinal direction X.

For each first clevis 902a-b, the front fan attachment 914 has a link rod 906a-b mounted in a hinged manner on the first clevis 902a-b about the corresponding first axis of rotation and on the second clevis 904a-b about the corresponding second axis of rotation.

The front fan attachment 914 makes it possible to react forces on Y and on Z.

In order to react forces on X, the front fan attachment has a system similar to the one in FIG. 11, with at least one finger 802 that is fastened to the load support 108 and extends radially with respect to the longitudinal direction X, and likewise a groove 804 that is coaxial with the longitudinal direction X and realized at the perimeter of the fan casing 204, where the free end of each finger 802 sits in the groove 804.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly comprising:
   a pylon configured to be fastened below a wing of the aircraft,
   a turbomachine comprising an engine attached to the pylon and a fan that is enclosed by a fan casing and is disposed upstream of the engine, said turbomachine having a longitudinal direction and a median plane,
   a nacelle surrounding the engine and the fan casing and having a load support disposed in a top part of the nacelle and lateral cowls mounted in a hinged manner on either side of the load support,
   a front fan attachment fastened between the fan casing and the load support, and
   a rear pylon attachment fastened between the pylon and the load support,
   wherein the front fan attachment comprises a positioning assembly disposed on the median plane, and two rotational systems disposed on either side of the median plane and of the positioning assembly,
   wherein the positioning assembly comprises a base that is secured to the top part of the fan casing and a peg that is secured to the load support, extends vertically and is inserted into a bore in the base,
   wherein each rotational system fastens the fan casing to the load support and allows rotation about an axis generally parallel to the longitudinal direction
   wherein the rear pylon attachment comprises a first clevis fastened below the load support, a second clevis fastened above the pylon, and a double plate disposed in the first clevis and the second clevis,
   wherein the double plate is mounted in a hinged manner on the first clevis about a first axis of rotation and on the second clevis about two second axes of rotation,
   wherein the first axis of rotation is generally parallel to the longitudinal direction and included in the median plane,
   wherein the two second axes of rotation are generally parallel to the longitudinal direction and disposed on either side of the median plane,
   wherein the rear pylon attachment comprises two first clevises, each of which is fastened below the load support, a second clevis fastened above the pylon, and, for each first clevis, a link rod,
   wherein each first clevis has a first axis of rotation generally parallel to the longitudinal direction and the two first axes of rotation are disposed on either side of the median plane,
   wherein the second clevis has three second axes of rotation generally parallel to the longitudinal direction, one of which is central and included in the median plane and two others of which are lateral and disposed on either side of the median plane,
   wherein one of the link rods is mounted in a hinged manner on one of the first clevises about the corresponding first axis of rotation and on the second clevis about a central second axis of rotation and a lateral second axis of rotation, and
   wherein the other link rod is mounted in a hinged manner on the other of the first clevises about the corresponding first axis of rotation and on the second clevis about the other lateral second axis of rotation.

2. An aircraft having at least one propulsion assembly according to claim 1.

3. A propulsion assembly for an aircraft, said propulsion assembly comprising:
   a pylon configured to be fastened below a wing of the aircraft,
   a turbomachine comprising an engine attached to the pylon and a fan that is enclosed by a fan casing and is disposed upstream of the engine, said turbomachine having a longitudinal direction and a median plane,
   a nacelle surrounding the engine and the fan casing and having a load support disposed in a top part of the nacelle and lateral cowls mounted in a hinged manner on either side of the load support,
   a front fan attachment fastened between the fan casing and the load support, and
   a rear pylon attachment fastened between the pylon and the load support,
   wherein the front fan attachment comprises a first clevis fastened in the top part of the fan casing and has two first axes of rotation generally parallel to the longitudinal direction and disposed on either side of the median plane, for each first axis of rotation, a second clevis fastened to the load support and disposed on the outside with respect to said first axis of rotation, where each second clevis has a second axis of rotation generally parallel to the longitudinal direction and for each first axis of rotation, a link rod mounted in a hinged manner on the first clevis about said first axis of rotation and on the second clevis about a corresponding second axis of rotation,
   wherein the front fan attachment has at least one finger that is fastened to the load support and extends radially with respect to the longitudinal direction, and a groove that is coaxial with the longitudinal direction and realized at a perimeter of the fan casing, and wherein a free end of each finger sits in said groove.

\* \* \* \* \*